United States Patent [19]
LaFiandra

[11] Patent Number: 5,917,644
[45] Date of Patent: Jun. 29, 1999

[54] INTEGRAL HIGH-ENERGY-BUTTON DEFORMABLE MIRROR

[75] Inventor: Carlo LaFiandra, New Canaan, Conn.

[73] Assignee: Raytheon Company, Lexington, Mass.

[21] Appl. No.: 09/071,510

[22] Filed: May 1, 1998

[51] Int. Cl.[6] ................................................. G02B 26/00
[52] U.S. Cl. .......................... 359/290; 359/223; 359/198; 359/224; 29/898.07; 248/468; 248/467
[58] Field of Search .................................. 359/198, 290, 359/223, 224, 846, 850, 230; 29/898.07; 248/468, 467

[56] References Cited

U.S. PATENT DOCUMENTS

| | | | |
|---|---|---|---|
| 4,626,063 | 12/1986 | Honey | 359/221 |
| 4,655,543 | 4/1987 | Montagu | 359/198 |
| 5,276,545 | 1/1994 | Daun et al. | 359/198 |
| 5,438,451 | 8/1995 | Schweizer | 359/224 |
| 5,550,669 | 8/1996 | Patel | 359/224 |

*Primary Examiner*—Loha Ben
*Attorney, Agent, or Firm*—W. C. Schubert; G. H. Lenzen, Jr.

[57] ABSTRACT

An assembly (22) comprises an optical substrate having a light reflective first surface (12) and an opposite back surface (14). At least one actuator stem (25) having a moving end (21) is provided and is associated with the back surface of the optical substrate. The optical substrate back surface has at least one integrally formed undercut button (19) and an actuator button (18) with a given thickness (T). The integrally formed button is connected to the actuator stem by an epoxy joint (38) which is distanced from the back surface by at least the dimension of the given thickness.

10 Claims, 5 Drawing Sheets

INTEGRAL HIGH-ENERGY-BUTTON DEFORMABLE MIRROR

BACKGROUND OF THE INVENTION

The present invention relates to a deformable mirror primarily intended for use as a beam train optic, and relates more particularly to a unique configuration of a deformable mirror capable of operating in an environment of an extremely high incident energy burst, such as at the National Ignition Facility now under design.

It is most important that a support for a high energy burst mirror be capable of withstanding the complete environment in which it operates without degradation. Except for the structure disclosed in copending U.S. patent application Ser. No. 08/982,920 entitled HIGH-ENERGY-BURST DEFORMABLE MIRROR, none of the current designs of such supports are capable of doing this. The invention disclosed in the aforementioned application does provide a lower cost solution to meet high energy requirements, but the mirror faceplate is a flat surface on both sides, and all the buttons are joined simultaneously under heat and pressure. The present invention is designed to work in the National Ignition Facility now being designed to produce sources of energy for the world by controlled fission. This facility requires 200 deformable mirrors for operation. The prior art consists of conventionally designed deformable mirrors where the actuators are attached directly to the back of the mirror with epoxy as seen in FIG. 1. These mirror-to-actuator connections have failed in controlled tests. In addition, Lawrence Livermore National Labs now has produced a configuration with a circumferential joint to the back of the deformable mirror as seen in FIG. 2. This configuration will deteriorate with time since the joint still experiences part of the incident energy.

Empiric data indicates that conventionally designed deformable mirrors fail in high burst energy mode environments because the epoxy joint between the back of the mirror and the top of the actuator gets too hot for even high temperature epoxies to survive (typically 400 to 600 degrees F.). In addition, analysis indicates that because of the short time duration of the energy burst, any metal subjected to the energy will get hot at the incident surface, but within one millimeter of depth, the temperature will rise no more than several degrees F. The next energy burst is done typically seven hours later, a more than adequate time for the system to thermally stabilize itself to initial conditions.

DEFORMABLE mirrors used in facilities such as the NIF are thus subjected to very high energy beams for very short duration. Typically 10 Joules/cm$^2$ for 200 microseconds. Conventionally designed deformable mirrors as seen in FIG. 1 would be destroyed by the heat generated because of absorption at the joint 3 between the back of the faceplate 1 and the attached actuator 2. Likewise, the other design connection between the faceplate 1' and the actuator 2' with the circumferential joint connection 3' undesirably absorbs energy at the joint interface.

Accordingly, an object of the invention is to produce a deformable mirror that has a low technical risk to fabricate and meets all of the requirements for use in a high energy burst mode without any degradation of performance of physical attributes.

It is another object of the present invention to provide a continually supported deformable mirror support that meets all of the requirements for use in a high energy burst mode without any degradation of performance of physical attributes.

A further object of the invention is to provide a joint to be used in a continually supported deformable mirror connected to a positioning actuator which operates without any degradation of its structural integrity as is now experienced with conventionally designed deformable mirrors.

Yet a further object of the invention is to provide a joint at the back of the deformable mirror faceplate that is connectable to a replaceable actuator and is capable of sustaining high temperature environments and using the drop in temperature of metal in series with this joint to attach such actuators with conventional epoxy.

Still a further object of the invention is to provide a support system of the aforementioned type which reduces the fabrication risk by integrally machining the buttons into the back surface of the faceplate.

Still a further object of the invention is to produce a joint where an epoxy joint is used and wherein the epoxy joint does not realize direct radiation from an energy source.

Yet still a further object of the invention is to provide a joint where a mechanical glass-to-metal joint is provided which does not induce high stress concentrations loads on the glass.

SUMMARY OF THE INVENTION

The invention resides in an assembly comprising an optical substrate having a light reflective first surface and an opposite back surface. At least one actuator stem having a moving end is provided and is associated with the back surface of the optical substrate. The optical substrate back surface having at least one integrally formed undercut button with a given thickness. The integrally formed button mechanically connected to a metallic plate which is in turn connected to the actuator stem by an epoxy joint which is distanced from the back surface by at least the dimension of the given thickness of the metallic plate.

Ideally, an actuator button is connected between the epoxy joint and the actuator stem and the glass actuator button connects to the metallic actuator button by a bolt connection and the actuator button has a back surface connected to aid actuator stem by the epoxy joint. In the preferred embodiment of FIG. 4A a clamp connects the glass button to a U-shaped metal bracket.

Preferably the actuator button has a given thickness which is equal to the given thickness of the undercut button and the actuator button is formed from a metal material.

Desirably, the actuator stem is connected a reaction plate 46 through the intermediary of a circumferential epoxy joint and the reaction plate includes a major opening for receiving the actuator stem therein. The reaction plate also includes a reaction block having a plurality of through openings each adapted to receive an elongated threaded member.

Preferably, the reaction plate includes at least one screw plate in which is provided a plurality of threaded openings, and which screw plate is secured to the reaction plate through the intermediary of an epoxy tack and a plurality of screw openings are provided through the reaction plate and are aligned with like openings in the reaction block and in the screw plate so that the threaded members connect through the reaction plate.

DETAILED DESCRIPTION OF THE PREFERRED EMBODIMENT

Figure 1:
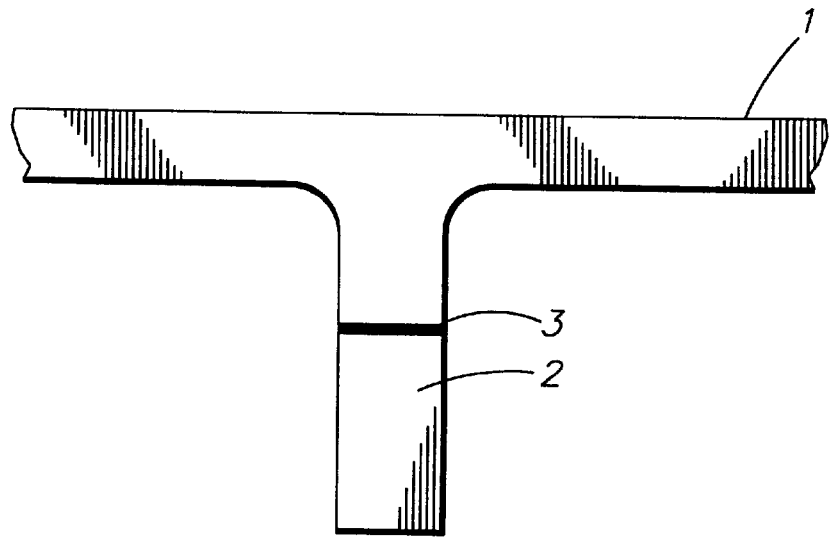
FIG. 1 is a schematic view of a prior art connection.
Figure 2:
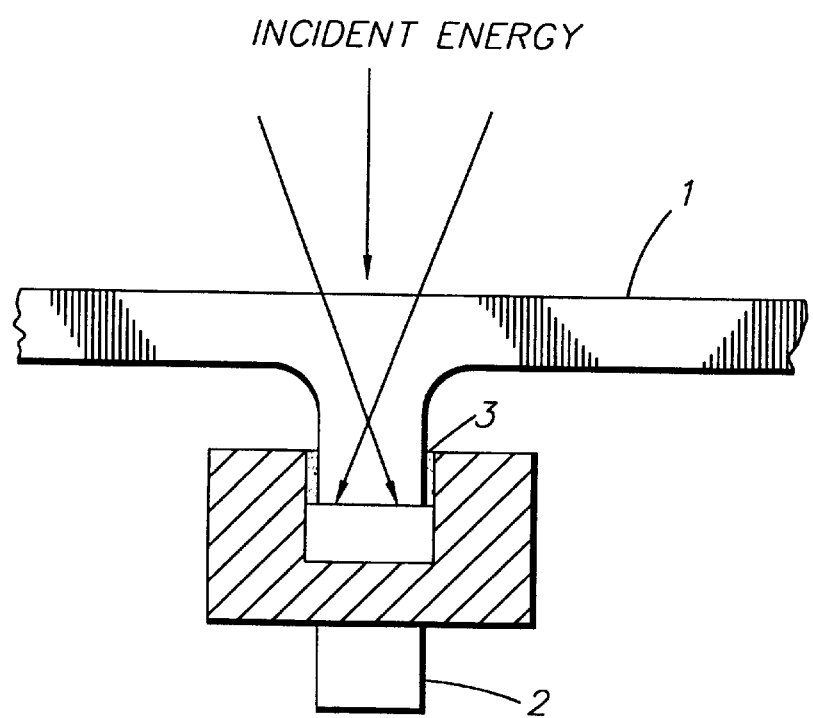
FIG. 2 is a schematic view of another prior art connection.
Figure 3:
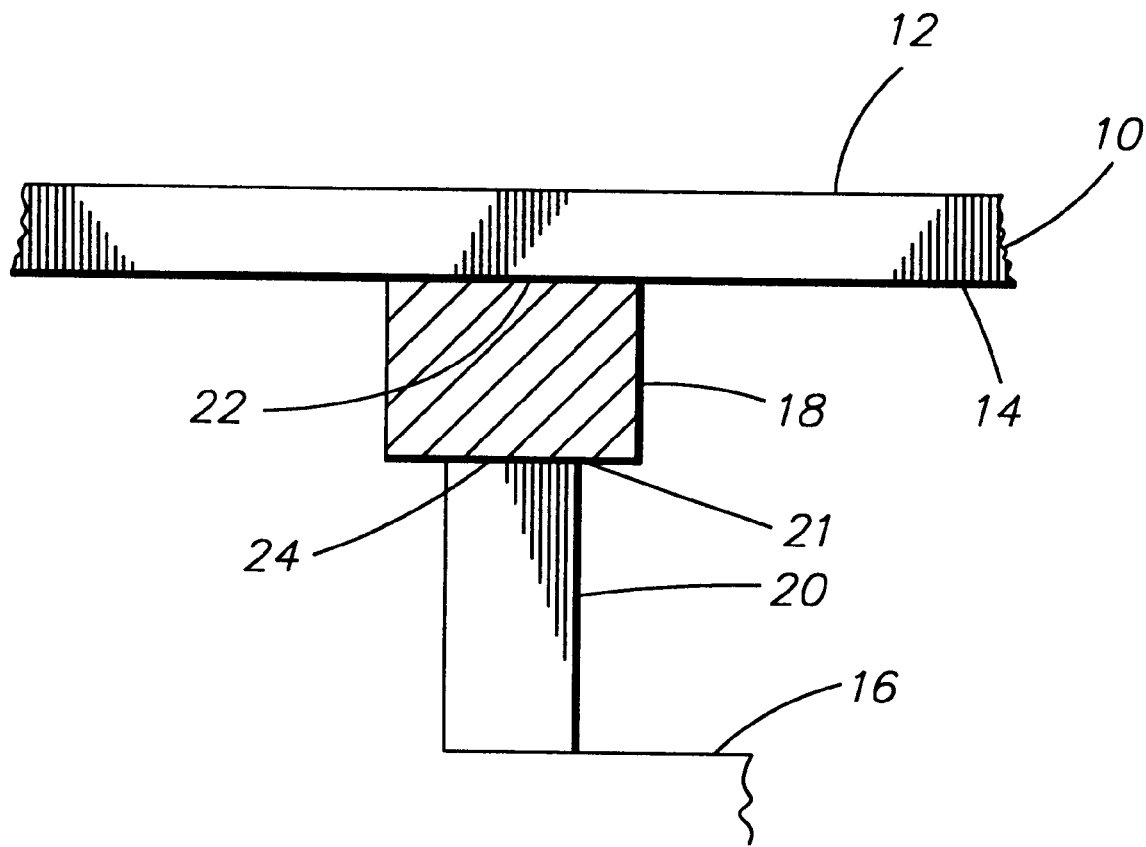
FIG. 3 is a schematic view of the connection of the invention.

The invention is as shown schematically in FIG. 3. As illustrated, the invention includes a faceplate 10 with a front reflective surface 12 and a rear supportive surface 14 which faces a base 16. A plurality of actuators 20,20 are mounted to the base 16 and each has a moving end 21 which connects to the rear of the face plate or mirror 10 in a manner in accordance with the invention.

A joint at the back of the deformable mirror faceplate that can sustain the high temperature environment and use the drop in temperature of metal in series with this joint to attach the actuators with conventional epoxy is disclosed herein. The configuration shown schematically in FIG. 3 shows such a joint. As shown therein, the faceplate 10 connects to the actuator 20 through a joint 22 used to attach metallic buttons 18, 19 to the actuator 20 through a secondary epoxy joint 24.

Research shows that energy reaching a joint connection at the rear surface 14 heats it to temperatures beyond the rating of epoxies used. Metal in series with the energy will rise in temperature (at its surface) to approximately 500° F. and drops off in temperature with distance. At 1 mm from the impinging surface, the temperature is within a few degrees of ambient. In the preferred embodiment, the configuration shown in FIGS. 3, 4a, 4b and 5 discloses the connection 22 at the rear surface 14 of the mirror 10 using an integrally formed button 19 joint capable of operating at approximately 1100° F.

Figure 4A:
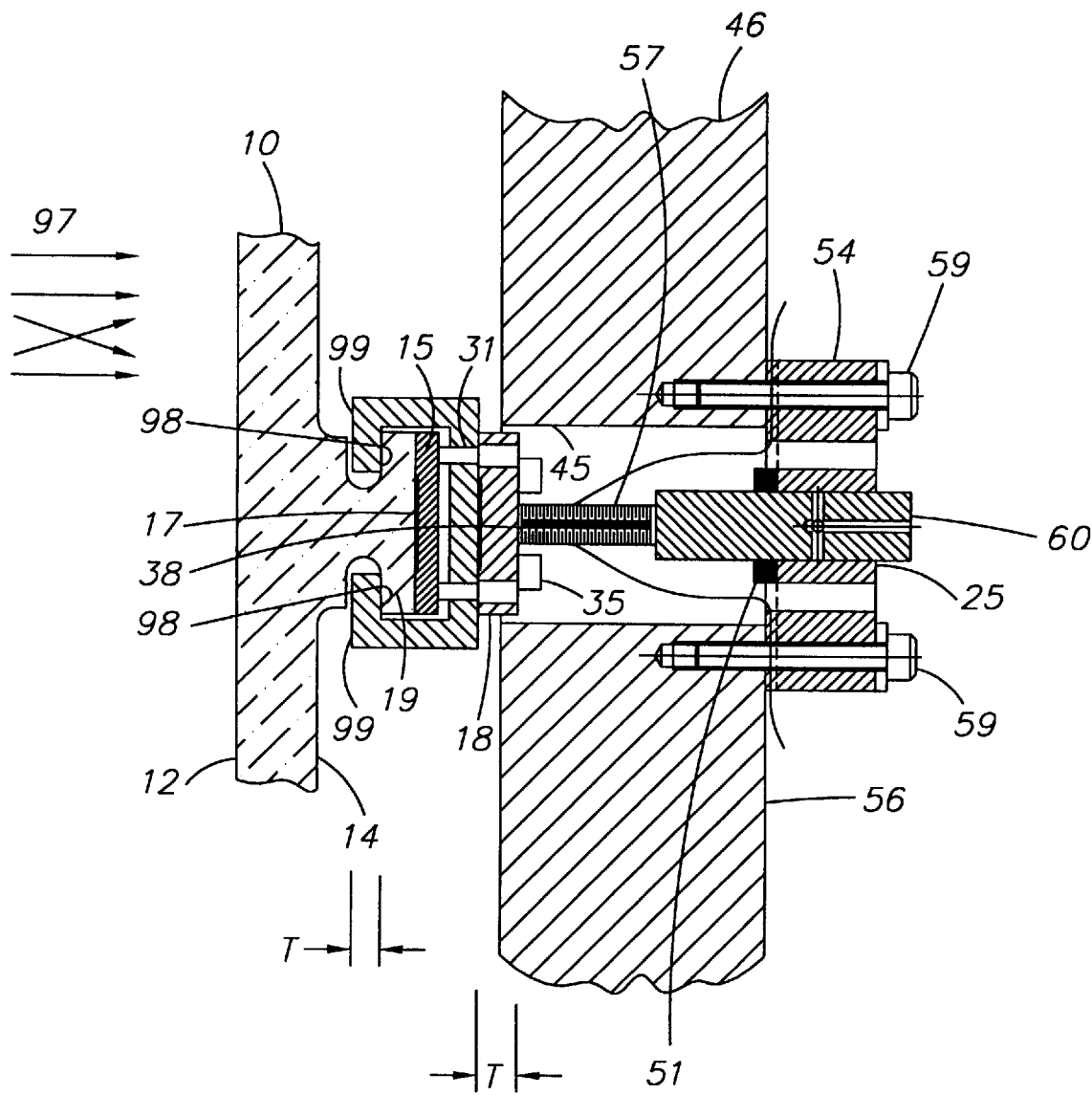
FIG. 4A is a partially fragmentary view of the preferred embodiment of the connection shown apart from the support system.

In accordance with the present invention as illustrated in the preferred embodiment of FIG. 4A at the connection 22, the rear surface 14 of the mirror or faceplate 10 has a T-shaped metallic button 19 integrally machined on the back 14 of the faceplate 10 and connected to an associated actuator stem 25 with a metal plate or button 18 fastened with a bracket 30. The bracket 30 has threaded openings 31,31 into which are threaded attachment screws 35,35. The metal button 18 is connected at an epoxy joint 38 to the free end of the actuator stem 25. The button 18 has a given thickness (T) which realizes in part the high energy of the laser that passes through the faceplate. The given thickness (T) which is selected, is sufficient to absorb the energy which is dissipated through the buttons. The bracket 30 has "bent" legs 99 which shield an epoxy joint 98 from the high incident energy 97 in the same manner that the thickness of the member 18 shields the actuator joint.

In addition to the integrally formed button 19 and the button 18, the joint 22 includes a separate clamping/heat absorbing copper block metallic button 15 provided between the integrally formed button 19 and the inner surface of the bracket 30 for further thermal isolation. The central region 17 of the button is undercut and is blacked for better deflection of thermal energy.

As will be discussed in greater detail later with respect to FIG. 5, the actuator stem 25 is mounted to a reaction plate 46 through the intermediary of a reaction block 54 which is threaded to the reaction plate 46 by screws 59,59. Each actuator stem is received within an associated major opening 45 formed in the reaction plate 46. A felt washer 51 is located on the stem 25 between the block 54 and the end 21, and leads 57,57 are passed through the opening 45 and connect to the stem 25 in the illustrated manner.

Figure 4B:
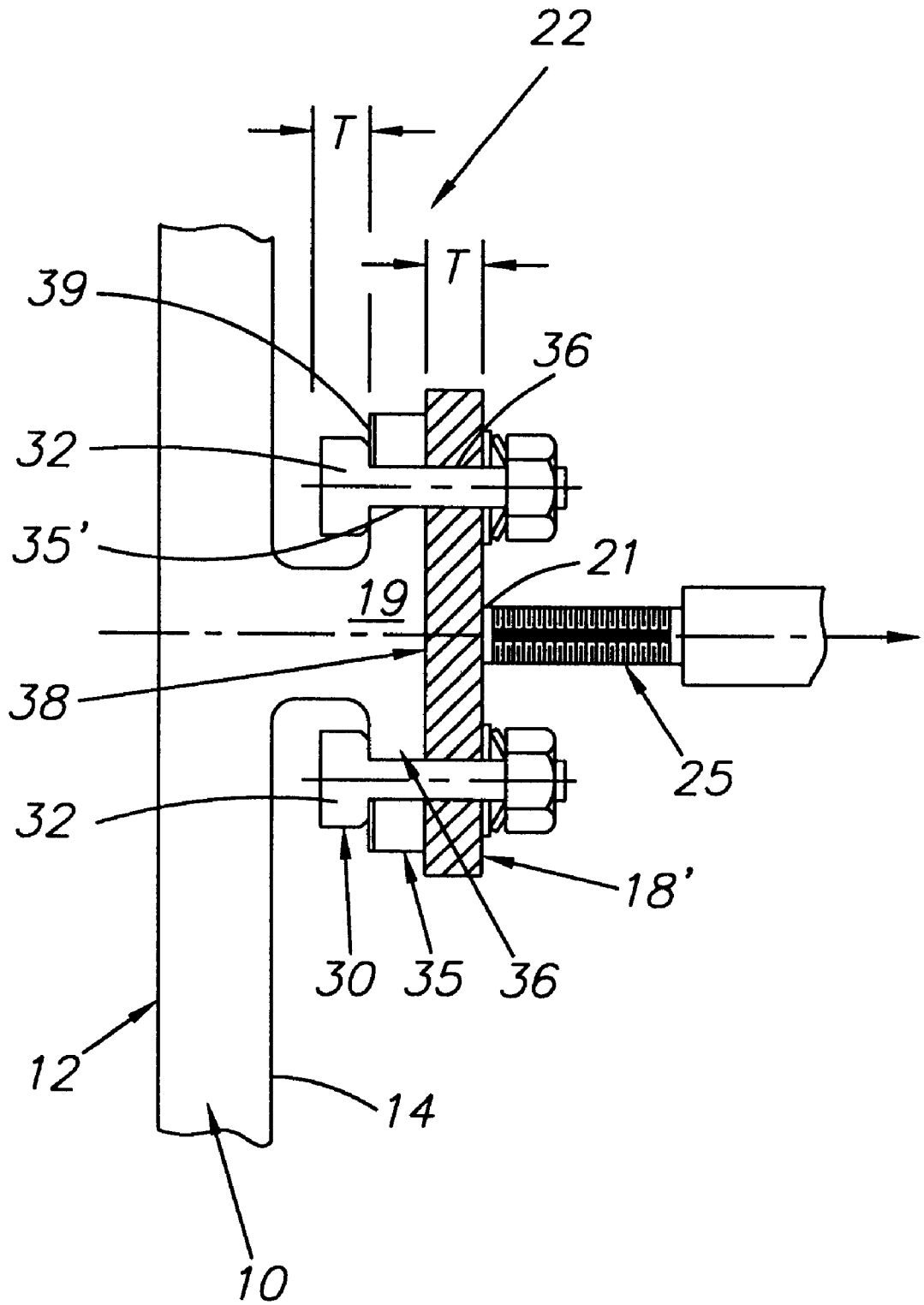
FIG. 4B is a partially fragmentary view of an alternative embodiment of the connection shown apart from the support system.

As illustrated in the alternate embodiment of FIG. 4B, the rear surface 14 of the mirror or faceplate 10 may have a T-shaped metallic button 19 integrally machined on the back 14 of the faceplate 10 and connected to an associated actuator stem 25 with a metal plate or button 18 fastened with special thick headed bolts 30, 30. The heads 32 of the bolts have a given thickness (T) which realize the high energy of the laser that passes through the faceplate. The given thickness (T) which is selected, is sufficient to absorb the energy which is dissipated through the buttons. In addition to the integrally formed button 19, the joint 22 includes the separate actuator metallic button 18' provided between the integrally formed button 19 and the actuator end 21 for further thermal isolation.

In the embodiment of FIG. 4B, each of the integrally formed buttons 19,19 and the separate actuator buttons 18',18' has slots 35,35 and openings 36,36, respectively, which are aligned with like openings in the other part so as to receive one of the bolts 30,30. In this way, the button pairs 18 and 19 are mechanically connected to one another. The side of the actuator button 19 which faces the actuator stem 25 is connected to the moving end thereof through the intermediary of an epoxy joint 38.

Since the surfaces which touch the undercut formed buttons 19,19 are only several degrees F above ambient temperature, standard epoxies can be used to bond the bolts to the underside of the button at point 39. The bolts 30,30 are located in corresponding slots 35',35' that are machined into the buttons. These bolts in turn hold the actuator button or metal plate 18' rigidly to the formed button 18. The thickness (T) of the metal "actuator button" 18 serves the same temperature dropping function as previously described. Conventional epoxy can thus be used to bond the actuator to this metal button, ensuring a joint that will experience low thermal stress conditions. In the preferred embodiment, the inner surface of the bolt heads 32 are also connected to the corresponding facing surface of the formed button 19,19 using an epoxy joint 39.

The placement of the metal button pairs 18 and 19 in series between the moving end 21 of the actuator stem 25 and the rear surface 14 of the mirror is key to the concept. That is, the thickness (T) of the joint pieces are made such that an actuator can be epoxy bonded at the joint 38 disposed between the actuator stem end 21 and the button 18 in a temperature zone not affecting the bond strength. Also, it is highly desirable for stiffness reasons to use butt joints between the actuator and the deformable mirror faceplate. The illustrated configuration achieves this. Removal of the nuts and washers on the bolts permits the actuator (and its metal button) to be removed.

Figure 5:
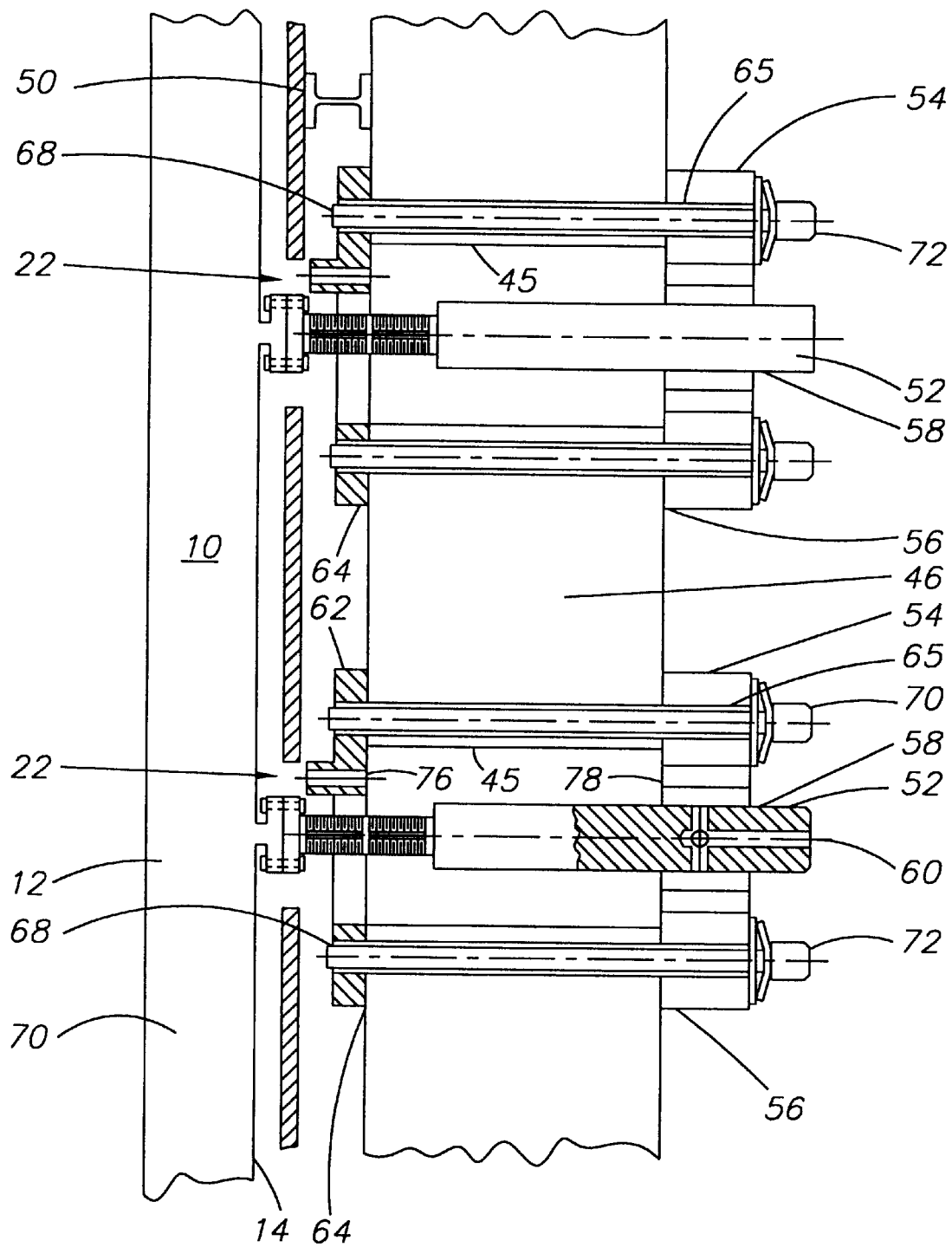
FIG. 5 is a partially fragmentary view of a connection shown with the support system.

Referring now to FIG. 5, it should be seen that in this embodiment of the invention, the joint discussed in FIG. 4A or FIG. 4B is used in a support system which is capable of standing up to high energy bursts. As such, a reaction plate 46 is provided and is connected to the face plate 10 through the intermediary of the aforementioned joint 22. In addition to the joint 22, a thermal shield 50 is mounted between the reaction plate 46 and the faceplate 10 through flexure members 50,50 secured to the reaction plate 46. The reaction plate 46 includes a major opening 45 for correspondingly receiving each actuator 20,20 being used.

Each actuator stem 52 is immovably connected to the reaction plate 46 through the intermediary of an epoxy joint connecting the stem to a reaction block 54. Each reaction block has a plurality of through openings 65,65 which receive an elongated threaded member 72,72. Each reaction block 54 is secured to the back of the reaction plate 46 by an epoxy tack 56 and each actuator stem 25 is connected to an associated reaction block 54 by a circumferential epoxy joint 58. A fill hole 60 is provided within the stem 60 for this purpose. The joint 58 is made last in the sequence of assembly, thus producing a stress free attachment of the actuator to the mirror and reaction plate. On the opposite side of the reaction plate 46 is mounted a screw plate 70 in which are provided a plurality of threaded openings 68,68, and which screw plate is secured to the reaction plate 46 through the intermediary of an epoxy tack 64. A plurality of screw openings 66,66 are provided in the reaction plate 46 and are aligned with like openings 65 and 68 in the reaction block 54 and in the screw plate 70 so that the threaded members 72,72 connect through the reaction plate in the illustrated manner. Anti-torque openings 76,76 may also be provided to effect torsional resistance where rigid members are inserted therein.

Accordingly, the invention has been described by way of illustration and not limitation.

I claim:

1. An assembly comprising:
   an optical substrate having a light reflective first surface and an opposite back surface;
   at least one actuator stem having a moving end associated with the back surface of said optical substrate; and
   said optical substrate back surface having at least one integrally formed undercut button, said integrally formed button being connected to an actuator button with a given thickness and connected to said actuator stem by an epoxy joint which is distanced from said back surface by at least the dimension of said given thickness.

2. An assembly as defined in claim 1 further characterized in that said undercut button connects to said actuator button by a threaded member connection.

3. An assembly as defined in claim 2 further characterized in that said actuator button has a back surface connected to said actuator stem by said epoxy joint.

4. An assembly as defined in claim 3 further characterized by said actuator button connected between said epoxy joint and said actuator stem having openings for said threaded member connection therein.

5. An assembly as defined in claim 4 further characterized by a bracket connected said actuator button and said undercut button.

6. An assembly as defined in claim 3 further characterized in that said actuator button has a given thickness which is equal to the given thickness of said undercut button.

7. An assembly as defined in claim 2 further characterized in that said actuator button is formed from a metal material.

8. An assembly as defined in claim 2 further characterized in that said actuator stem is connected to a reaction plate through the intermediary of an epoxy joint and said reaction plate includes a major opening for receiving said actuator stem therein.

9. An assembly as defined in claim 8 further characterized in that said reaction plate includes a reaction block having a plurality of through openings each adapted to receive an elongated threaded member.

10. An assembly as defined in claim 9 further characterized in that said reaction plate includes at least one screw plate in which is provided a plurality of threaded openings and which screw plate is secured to the reaction plate through the intermediary of an epoxy tack and a plurality of screw openings are provided through the reaction plate and are aligned with like openings in the reaction block and in the screw plate so that said threaded members connect through the reaction plate.

* * * * *